United States Patent
Schwartz et al.

[11] Patent Number: 6,080,288
[45] Date of Patent: Jun. 27, 2000

[54] SYSTEM FOR FORMING NICKEL STAMPERS UTILIZED IN OPTICAL DISC PRODUCTION

[76] Inventors: Vladimir Schwartz, 12 Revolutionary Rd., Lexington, Mass. 02173; Michael Schwartz, 141R Chestnut St.; Doron Dagan, 300F Brookside Dr., both of Andover, Mass. 01810; Klaus M. Bierwagen, 95 Crisci St., Leominster, Mass. 01453; Ronald E. Blazo, 11 Maple St., Shirley, Mass. 01464

[21] Appl. No.: 09/087,788

[22] Filed: May 29, 1998

[51] Int. Cl.$^7$ .............. C25D 1/00; C25D 17/00; C25D 21/10

[52] U.S. Cl. .............. 204/224 R; 204/238; 204/239; 204/273; 204/275; 204/287; 205/68

[58] Field of Search ............... 204/224 R, 237, 204/238, 239, 269, 273, 275, 276, 287, DIG. 7; 205/68, 70, 96, 133

[56] References Cited

U.S. PATENT DOCUMENTS

| | | | |
|---|---|---|---|
| 4,304,641 | 12/1981 | Grandia et al. | 204/23 |
| 5,244,563 | 9/1993 | Langenskiold et al. | 205/68 |
| 5,421,987 | 6/1995 | Tzanavaras et al. | 205/133 |
| 5,514,258 | 5/1996 | Brinket et al. | 204/237 |
| 5,597,460 | 1/1997 | Reynolds | 204/212 |
| 5,683,564 | 11/1997 | Reynolds | 205/68 |
| 6,001,235 | 12/1999 | Arken et al. | 205/137 |

*Primary Examiner*—Kathryn Gorgos
*Assistant Examiner*—William T. Leader

[57] ABSTRACT

A system and method for electro-forming a metal layer on a substrate. The system has a rotary jet planarizer in an electro-forming or galvanic cell. The cell includes a toroidally-shaped manifold with two inlets and an outlet. Each of the inlets is coupled to tubing from a sump assembly. Pressurized electrolyte flows from the sump assembly to the manifold. Directly downstream from the manifold is a diffuser having a plurality of openings. Electrolyte flows through the diffuser to an toroidally-shaped anode basket filled with metal pellets. After flowing through the anode basket, the electrolyte flows to a rotary jet planarizer. The planarizer has a rotatable plate with a main opening, a plurality of apertures radially extending from the main opening, and a conduit that is coupled to the main opening and extends out of the cell. A motor is coupled to the rotary jet planarizer to rotate the plate. The rotating plate directs the electrolyte to a cathode assembly in multiple streams so that the electrolyte washes evenly over a wide, ring-shaped area of a glass master held in a cathode assembly. A layer of metal is galvanically deposited on the glass master. Flow of electrolyte in the cell may follow one of two patterns: a radial pattern or a central pattern. Electrolyte may flow through two returns positioned adjacent to the rotary jet planarizer, one on each side of the cell or through the conduit coupled to the main opening in the plate. The two returns and conduit are coupled to the sump assembly, where the electrolyte is filtered and then pumped back to the cell.

18 Claims, 3 Drawing Sheets

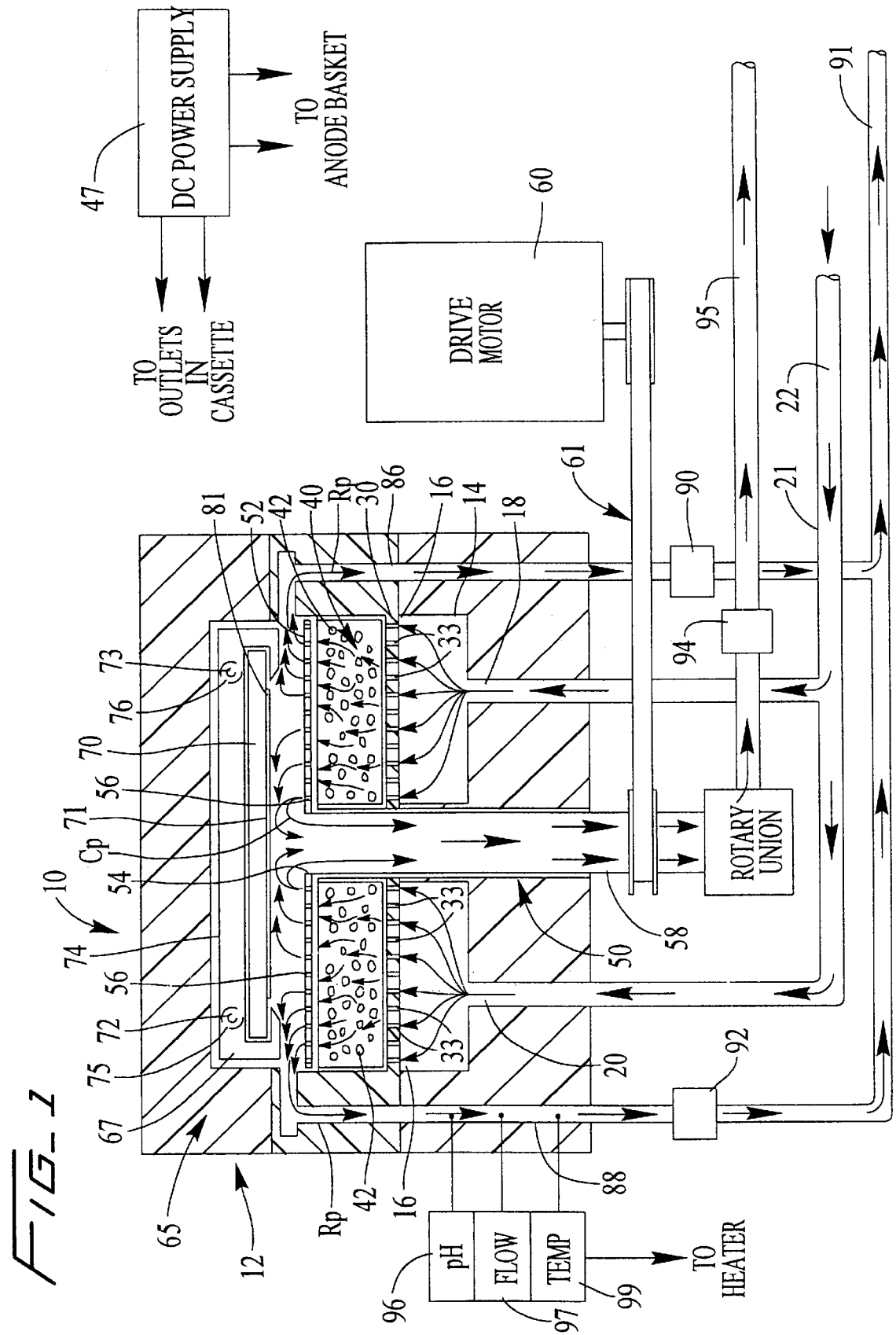

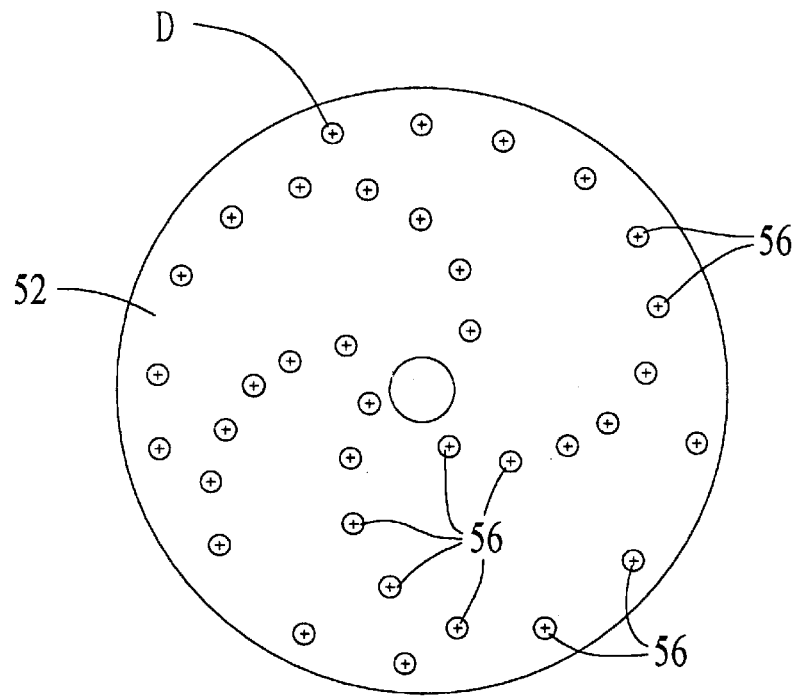
FIG_2
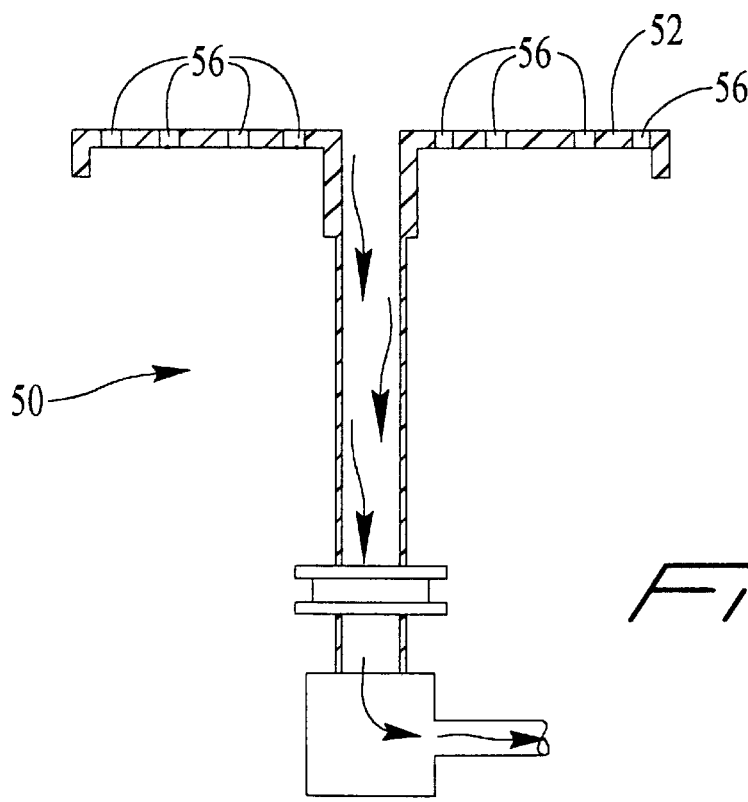
FIG_3

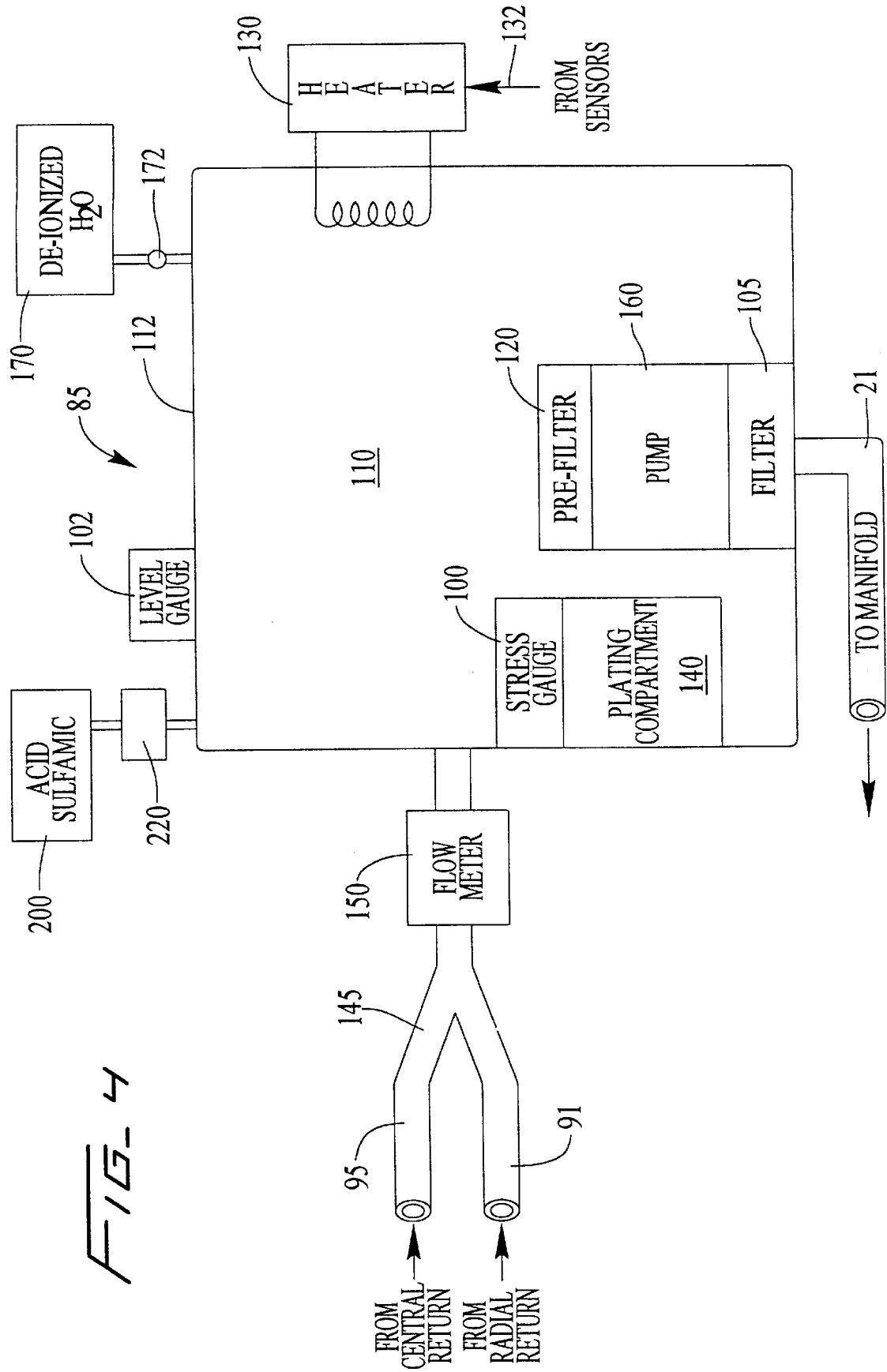

SYSTEM FOR FORMING NICKEL STAMPERS UTILIZED IN OPTICAL DISC PRODUCTION

FIELD OF THE INVENTION

The present invention relates to optical discs such as compact discs ("CDs") and digital versatile discs ("DVDs"), which are used to store digital and digitized information such as computer software and video and sound recordings. More particularly, the present invention relates to the manufacture of such discs and an apparatus and method for forming the stampers used to create the information carrying layers in such discs.

BACKGROUND OF THE INVENTION

DVDs and CDs are used as a storage media for digital and digitized information. They are made from one or more component discs of optical grade polycarbonate. In the process of manufacturing an optical disc, a nickel stamper (a metal matrix that contains digital data in the form of data protrusions) is used to form an information carrying layer in the polycarbonate. Specifically, polycarbonate is injected into a mold holding a nickel stamper. A negative image of the protrusions is formed in the polycarbonate during the molding process. The molded image (which consists of data pits) is subsequently covered with a reflective coating. Then the reflective coating is sealed with a protective layer, for example, a lacquer.

Presently, stampers are manufactured utilizing an electro-forming or electro-plating galvanic process. The process creates circular stampers (approximately 140 mm outer diameter, 34 mm inner diameter) that are electrolytic, nickel substrates (about 300±3 microns thick). During the process, metal ions dissolved in a nickel sulfamate solution are deposited over the electrically conductive surface of a glass master. The glass master is manufactured by a laser mastering process. Typically, glass masters are manufactured from highly-polished, circular glass pieces (for example, 240 mm in diameter, 6 mm thick) covered with a layer of photo-resist material. The mastering process involves laser beam recording or conversion of digital data into geometrically shaped data pits. Data pits are formed in the photo-resist layer covering the glass master's top surface. Subsequently, the photo-resist covered glass master surface is vacuum metalized (with silver, nickel, or other suitable materials) to make it electrically conductive. Once vacuum metalized, a glass master is ready for use in the electro-forming process of creating a nickel stamper.

The data pits in the glass master are precisely replicated in the electro-forming process as nickel ions are gradually deposited over the conductive surface of the glass master. Using present technology, this process takes approximately one hour. After the desired stamper thickness is achieved (determined by a current/time/deposition rate calculation according to Faraday's law), the glass master and stamper are removed from the electro-forming galvanic cell. Subsequently, the nickel stamper is separated from the surface of the glass master. The nickel stamper is a negative copy of the glass master.

Stampers produced in known processes usually have a non-uniform thickness. Stamper thickness non-uniformity is caused by non-uniform current distribution of nickel-carrying electrolyte. Non-uniform current distribution also increases the time required for stamper manufacturing. One method of reducing these problems is to reduce nickel deposition rates (via lower current density) and increase the distance between the anode (negative potential connected to a titanium wire basket containing nickel pellets) and the cathode (positive potential connected to a metalized glass master) surfaces. However, even these techniques do not produce a stamper with suitable characteristics in as short a period of time as is desirable.

Most presently used electro-forming systems are rotary-cathode systems based on the stampers utilized in vinyl record manufacturing. Rotary electro-forming systems consist of a large capacity tank or sump filled with a temperature and pH regulated nickel-sulfamate solution (approximately 60 gallons per single anode/cathode arrangement), a rotary cathode (negative potential, rotational speed up to 100 rpm), and a stationary anode (positive potential, titanium mesh basket with sulfur containing nickel pellets). When electrical potential is applied between the cathode and anode, the nickel pellets in the titanium mesh basket of the anode actively dissolve to the ionic state and "attach" or plate out on the cathode surface. The nickel deposition rate can be increased by increasing the rotation of the cathode; increased rotation decreases the ion diffusion zone at the cathode surface. Rotation also improves electrical current distribution and nickel deposit uniformity.

Rotary-cathode, electro-forming systems operate with a DC power supply of 0–250 amps and 0–24 volts. Higher DC power level or current density can be utilized (up to 1000 amps/ft$^2$ for a given nickel sulfamate concentration), but at such levels electrical field uniformity and distribution are poor. Thus, in present systems current density is limited to about 150 amps/ft$^2$. This relatively low current density reduces overall process throughput (the amount of time required for stamper manufacturing).

Other rotary systems, including rotary-anode, electro-forming systems, are also available. These systems contain a rotary anode (with nickel pellets and rotational speeds of about 50 to 70 rpm) and an electrolyte pumping assembly. Pressurized electrolyte solution (at about 30 to 50 psig) is pumped through the anode housing at a flow rate of 10 to 12 gallons per minute. The electrolyte jets improve electrical field distribution (via improved ionic concentration) which, in turn, increases current density and the nickel deposition rate. However, even rotary anode systems are not completely satisfactory; Both rotary cathode and anode systems require rotational electrical contacts and high-power, gear motor drives. These requirements reduce overall system reliability and efficiency.

In response to the problems associated with rotary systems, there have been some attempts to design suitable stationary electro-forming systems (non-rotating anode and cathode). A typical stationary electro-forming system requires pressurized electrolyte solution to be pumped through its anode assembly directed towards or away from its cathode assembly. Rapidly pumped electrolyte solution provides for good electrolyte mixing and current distribution, which increases the nickel deposition rate. Further, the overall cost of a stationary system is lower than a rotary system. However, process reliability and quality control in present stationary electro-forming systems are lower than for presently available rotary systems.

The demands for faster, less expensive optical discs and increased data density of such discs necessitate improved quality and faster electro-forming systems (both for pre-recorded and recordable media). As described above, the disadvantages of stationary and rotary electro-forming systems, such as non-uniform nickel deposits and lengthy and complicated stamper manufacturing processing, are unacceptable. Accordingly, there is a need for an improved electro-forming system for producing nickel stampers.

OBJECTS AND SUMMARY OF THE INVENTION

Therefore, it is an object of the present invention to provide an improved system for electro-forming nickel stampers used to create optical discs.

It is another object of the present invention to provide a rotary jet, high-speed electro-forming system for creating nickel stampers.

These and other objects are achieved in a system for electro-forming a metal layer on a substrate. The system has a rotary jet planarizer in an electro-forming or galvanic cell. The cell includes a toroidally-shaped manifold with two inlets and an outlet. Each of the inlets is coupled to tubing from a sump assembly. Pressurized electrolyte flows from the sump assembly to the manifold. Directly downstream from the manifold is a diffuser having a plurality of openings. Electrolyte flows through the diffuser to an anode housing or basket. The anode basket is also toroidally shaped and designed to hold a quantity of metal pellets.

After flowing through the anode basket, the electrolyte flows to a rotary jet planarizer. The planarizer has a rotatable plate with a main opening, a plurality of apertures radially extending from the main opening, and a conduit coupled to the main opening and extending out of the cell. A motor is coupled to the rotary jet planarizer and, in operation, rotates the plate at about 30 to about 50 revolutions per minute (rpm). The rotating plate directs the electrolyte to a cathode assembly in multiple streams so that the electrolyte washes evenly over a wide, ring-shaped area of a glass master held in the cathode assembly.

Two returns are positioned adjacent to the rotary jet planarizer, one on each side of the cell and each is positioned near the periphery of the cell. Electrolyte flows through the returns back to the sump assembly, where the electrolyte is filtered and pumped back to the cell. The electrolyte may also be monitored in the cell and conditioned in the sump assembly.

A power supply is electrically coupled to the anode basket and the cathode assembly via electrical cables and nickel plated copper contacts. Electrical contacts are located on the back side of the anode basket and the cathode assembly.

These are just some of the features and advantages of the present invention. Many others will become apparent by reference to the detailed description of the invention taken in combination with the accompanying drawings.

BRIEF DESCRIPTION OF THE DRAWINGS

In the drawings:

FIG. 1 is a schematic, cross-sectional view of a electro-forming system according to the teachings of the present invention including an electro-forming cell;

FIG. 2 is top plan view of the plate of the rotary jet planarizer in the electro-forming cell;

FIG. 3 is schematic, cross-sectional view of the rotary jet planarizer in the electro-forming cell; and FIG. 4 is a schematic view of a sump assembly for the electro-forming system of the present invention.

DETAILED DESCRIPTION

The central components of an electro-forming system 10 are shown schematically in FIG. 1. The system 10 is designed to electro-form or plate a nickel stamper, although by changing the chemistry of the electrolyte of the system other types of metal plates, such as copper and gold, could be formed with the system 10. However, the system 10 is particularly useful for forming nickel stampers. Thus, nickel chemistry will be described herein in detail.

The system 10 includes a galvanic or electro-forming cell 12. The cell 12 includes a toroidally-shaped manifold 14 having an outlet 16 and a first inlet 18 and a second inlet 20. The first and second inlets 18 and 20 are coupled to a supply conduit 21 which carries pressurized electrolyte 22 from a sump assembly (discussed below). Preferably, the electrolyte 22 is a nickel-sulfamate solution. Nickel-sulfamate solution is commercially available from many companies including AtoTech, MacDermid, and Brooktronics.

A diffuser 30 is positioned downstream of the outlet 16 of the manifold 14. The diffuser 30 has a plurality of openings 33 and, like the manifold 14, is toroidally shaped. The diffuser 30 directs the electrolyte 22 to a removable anode housing or basket 40, which is positioned downstream from the diffuser. The anode basket 40 is designed to hold nickel pellets 42 and may be constructed from titanium wire. Preferably, the nickel pellets 42 are 10 to 12 millimeters in diameter, and are doped with sulfur. Pellets suitable for use in the present invention are available from Inco Corp., U.K. As the electrolyte is pumped through the removable toroidal anode basket 40, the spherical nickel pellets 42 dissolve in the electrolyte 22. As should be understood, the electrolyte 22 is electrically active due to an applied DC current supplied by a power supply 47 which is coupled to the anode basket 40. The power supply 47 is a DC supply capable of delivering a DC current at 160 amps and up to 30 volts.

The now nickel-ion rich electrolyte 22 is directed to the cathode assembly (explained below) of the cell 12. A rotary jet planarizer 50 is used to direct the electrolyte 22 and control the electric field between the anode basket 40 and the cathode assembly in a specific manner. The planarizer 50 has a rotatable plate 52 made from a plastic, non-conductive material, such as CPVC or polypropylene, with a main opening 54 and a plurality of apertures 56 extending radially from the main opening 54, and a pipe or conduit 58 coupled to the main opening 54 and extending out of the cell 12. The plate 52 of the rotary jet planarizer 50 is positioned downstream from the anode basket 40.

As best seen by reference to FIG. 2, the apertures 56 of the plate 52 are arranged in a spiraling pattern and each aperture 56 has a diameter D. The diameters D of the apertures 56 positioned near the center of the plate 52 are smaller than the diameters D of the apertures 56 positioned near the perimeter of the plate. Specifically, the diameter D of each aperture 56 is dependent on its radial distance from the center of the plate 52, with the diameter of the apertures becoming increasingly larger as their radial distance from the center of the plate increases. It has been found that optimal plating performance is achieved when the diameters D of the apertures closest to the center of the plate are about ⅛" and the diameters D the apertures at the periphery of the plate are about ¼".

The planarizer 50 is coupled to a motor 60 (FIG. 1) through a transmission 61, which may be one of many known devices including the belt and pulley system shown. Preferably, the motor 60 is an electric motor. More importantly, however, the motor 60 must be operable to rotate the plate 52 at about 30 to about 50 rpm. When the plates 52 is rotated, it jets the electrolyte out of itself in multiple streams so that the electrolyte washes evenly over a relatively wide, ring-shaped area.

Spaced about 10 to about 15 millimeters from the plate 52, and adjacent to it, is a cathode assembly 65. The cathode assembly includes a removable cassette 67 which holds a glass master 70 having a top surface 71. The cassette 67 has two male contacts 72 and 73 on its back side 74. The contacts 72 and 73 are received in two electrical outlets 75 and 76 when the cassette 67 is placed in the cell 12. The outlets 75 and 76 are coupled to the power supply 47.

As noted above, the glass master 70 is covered with a metal layer before it is inserted in the cell 12. Therefore, it is conductive. The glass master 70 is electrically coupled to the contacts 71 and 72 via a metal clamp ring (not shown). When electrically charged, the glass master 70 attracts metal ions in the electrolyte 22 as it is washed across the top surface 71 by the planarizer 50. As noted above, electrolyte 22 washes evenly over a wide, ring-shaped area of the glass master 70 and some metal ions in the electrolyte plate out of the solution onto the surface 71 to form a layer of metal or metal matrix 81. As it rotates, the planarizer 50 homogenizes the electrolyte, and concentrates the electrical field. This results in highly-uniform, rapid deposits.

After the electrolyte 22 is washed across the glass master 70 it is directed away from the cathode assembly 65 to a sump assembly 85 (FIG. 4). The electrolyte 22 may flow out of the cell 12 through one or more returns positioned adjacent the plate 52. A first return 86 is positioned on one side of the cell 12 near its periphery and a second return 88 is positioned on the opposite side of the cell, also near its periphery. The returns 86 and 88 are coupled to a main radial return 91 which in turn is coupled to the sump assembly 85. Flow through the returns 86 and 88 is controlled by valves 90 and 92.

As should be apparent, when the valves 90 and 92 are closed, flow through the returns 86 and 88 is shut off. However, the electrolyte 22 may alternatively flow out of the cell 12 through the conduit 58 which is connected through a valve 94 to a main central return 95 which, in turn, is coupled to the sump assembly 85. Thus, electrolyte flow out of the cell 12 may follow one of two general patterns: a radial pattern Rp and a central pattern Cp. Electrolyte may flow through the two returns 86 and 88 or through the conduit 58 coupled to the main opening 54 in the plate 50. The valves 90, 92, and 94 may be used to control the flow. It has been found that changing the fluid outflow patterns by switching the outflow valves 90, 92, and 94 so that electro-forming or plating begins with radial outflow of electrolyte and later is changed over to central outflow helps to enhance planarization (even horizontal deposition) of nickel deposits on the glass master 70. It has been found that periodic cycling of the radial and central outflow provides the best results. In particular, outflow patterns should be switched every 3 to 5 minutes. Automatic switching can be accomplished by controlling the valves 90, 92, and 94 with a microprocessor, PLC, or other programmable device (not shown).

The constant circulation of the electrolyte 22 through the cell promotes even ion distribution in the electrolyte. Furthermore, as the electrolyte is circulated to and from the sump assembly 85 it may be conditioned in order to optimize the chemical deposition process occurring on the glass master 70. Thus, the system 10 includes in-situ process controls for measuring electrolyte solution stress, pH, temperature, level, flow, and other parameters. A pH sensor 96, flow sensor 97, and temperature sensor 99 measure conditions in the radial return 88. Other similar sensors (not shown) may measure the conditions in the central conduit 58 and the return 86. A stress gauge 100 and ultrasonic level control 102 are located in the sump assembly 85.

The sump assembly 85 also includes a filter 105. The filter 105 removes sludge formations, which are by-products of dissolved nickel, and other impurities in the electrolyte 22. The filter 105 may take the form of a removable polyester screen or filter module with a $40\mu$ thick screen which is capable of removing particles having sizes ranging from about $70\mu$ to about $150\mu$.

The sump assembly also has a reservoir 110, which in one embodiment is manufactured from polypropylene and has a capacity of approximately 60 gallons. The reservoir houses the filter 105, the ultrasonic electrolyte level control 102 which is mounted on the top 112 of the reservoir 110, a second, pre-filter 120 for filtering particles of about $10\mu$ and larger, a titanium heater 130, and a separate "dummy" plating compartment 140 for electrolyte stress control and purification. The heater 130 includes a feed back circuit 132 coupled to the temperature sensors in the system 10 (such as sensor 99) and maintains the temperature of the electrolyte 22 between about 50° C. to about 60° C. The compartment 140 has a capacity of approximately 10 gallons and includes a corrugated surface cathode and a titanium basket anode (not shown).

The main radial return 91 and main central return 95 are coupled to a Y-shaped fitting 145 which in turn is coupled to an electrolyte flow meter 150. The flow meter 150 measures the amount of electrolyte flowing out of the cell 12 and into the reservoir 110. A magnetically-coupled pump 160, which is operable to provide up to 30 psi output pressure and a flow rate of about 10 to 15 gallons per minute, is positioned in the reservoir 110 and pumps electrolyte back to the cell 12 through the supply conduit 21.

Coupled to the sump assembly 85 is a source 170 of de-ionized water. Flow of deionized water from the source 170 is controlled by a valve 172. De-ionized water is periodically added to the electrolyte 22 to replenish water lost due to evaporation or out-gassing during electro-forming of the matrix 81.

In addition to the source 170 of de-ionized water, a source 200 of sulfamic acid is coupled to the sump assembly 85. In order to optimize the electro-forming process, the pH of the electrolyte 22 must be kept between about 3.8 and about 4.2. As noted above, the pH of the electrolyte is monitored during the electro-forming process and, if found to be out of range, an amount of sulfamic acid is added to the electrolyte through a metering pump 220.

As is evident from the description above, the rotary jet planarizer, and dual-circuit, closed-loop design of the present invention improves process reliability and allows for higher deposition rates as compared to current-art stationary and rotary systems. In fact, in the present system current density of up to 500 amp/ft$^2$ may be achieved.

While the invention has been described in what are believed to be the most preferred embodiments, modifications to various components may be made and would be apparent to those skilled in the art. Thus, it is to be understood that the invention is not confined to the particular construction and arrangement of the components herein illustrated and described, but embraces such modified forms thereof as come within the scope of the appended claims.

What is claimed is:

1. A rotary jet cell for electro-forming a metal layer on a substrate, the cell comprising:
   a manifold having one or more inlets for introducing electrolyte into the cell and at least one outlet;
   a diffuser positioned downstream of the at least one outlet of the manifold, the diffuser having a plurality of openings;

an anode basket for holding metal pellets and positioned downstream of the diffuser;

a rotary jet planarizer having a rotatable plate with a main opening, a plurality of apertures extending radially from the main opening, and a conduit coupled to the main opening and extending out of the cell, the plate of the rotary jet planarizer positioned downstream from the anode basket;

a cathode assembly spaced from and positioned adjacent to the rotary jet planarizer; and one or more returns positioned adjacent the plate and for removing electrolyte from the cell.

2. A cell as in claim 1, wherein the apertures in the plate are arranged in a spiraling pattern and each aperture has a diameter and the diameters of the apertures positioned near the center of the plate are smaller than the diameters of the apertures positioned near the perimeter of the plate.

3. A cell as in claim 2, wherein the diameter of each aperture is dependent on its radial distance from the center of the plate, with the diameter of the apertures becoming increasingly larger as their radial distance from the center of the plate increases.

4. A cell as in claim 1, wherein the cathode assembly includes a removable cassette and a glass master held by the cassette.

5. A cell as in claim 1, wherein the cathode assembly is spaced about 10 to about 15 millimeters from the plate of the rotary jet planarizer.

6. A cell as in claim 1, wherein the plate is made from a non-conductive material.

7. A cell as in claim 1, wherein the returns are positioned near the periphery of the cell.

8. A system for electro-forming a metal layer on a substrate, the system comprising:

a cell having
a manifold with one or more inlets for introducing electrolyte into the cell and at least one outlet;
a diffuser positioned downstream of the at least one outlet of the manifold, the diffuser having a plurality of openings;
an anode basket for holding metal pellets and positioned downstream of the diffuser;
a rotary jet planarizer having a rotatable plate with a main opening, a plurality of apertures radially extending from the main opening, and a conduit coupled to the main opening and extending out of the cell, the plate of the rotary jet planarizer positioned downstream from the anode basket;
a cathode assembly spaced from and positioned adjacent to the rotary jet planarizer; and
one or more returns positioned adjacent to the plate and for removing electrolyte from the cell;

a motor coupled to the rotary jet planarizer;

a supply conduit coupled to the one or more inlets of the manifold;

a return conduit coupled to the one or more returns;

a sump assembly having an outlet coupled to the supply conduit and an inlet coupled to the return conduit; and a power supply electrically coupled to the anode basket and the cathode assembly.

9. A system as in claim 8, wherein the motor is operable to rotate the planarizer at about 30 to about 50 rpm.

10. A system as in claim 8, wherein the power supply is operable to supply a DC current at about 160 amps and 30 volts.

11. A system as in claim 8, wherein the sump assembly is operable to pump electrolyte solution through the anode basket at a rate of 10 to about 15 gallons per minute.

12. A system as in claim 8, wherein the sump assembly is operable to remove particles as small as about $70\mu$ from electrolyte in the system.

13. A system as in claim 8, wherein the sump assembly further includes a heater and a plating compartment.

14. A system as in claim 8, further comprising a source of de-ionized water coupled to the sump assembly.

15. A system as in claim 8, wherein the apertures in the plate are arranged in a spiraling pattern and each aperture has a diameter and the diameters of the apertures positioned near the center of the plate are smaller than the diameters of the apertures positioned near the perimeter of the plate.

16. A system as in claim 15, wherein the diameter of each aperture is dependent on its radial distance from the center of the plate, with the diameter of the apertures becoming increasingly larger as their radial distance from the center of the plate increases.

17. A system as in claim 8, wherein the cathode assembly includes a removable cassette and a glass master held by the cassette.

18. A system as in claim 8, wherein the cathode assembly is spaced about 10 to about 15 millimeters from the plate of the rotary jet planarizer.

* * * * *